Figure 1:
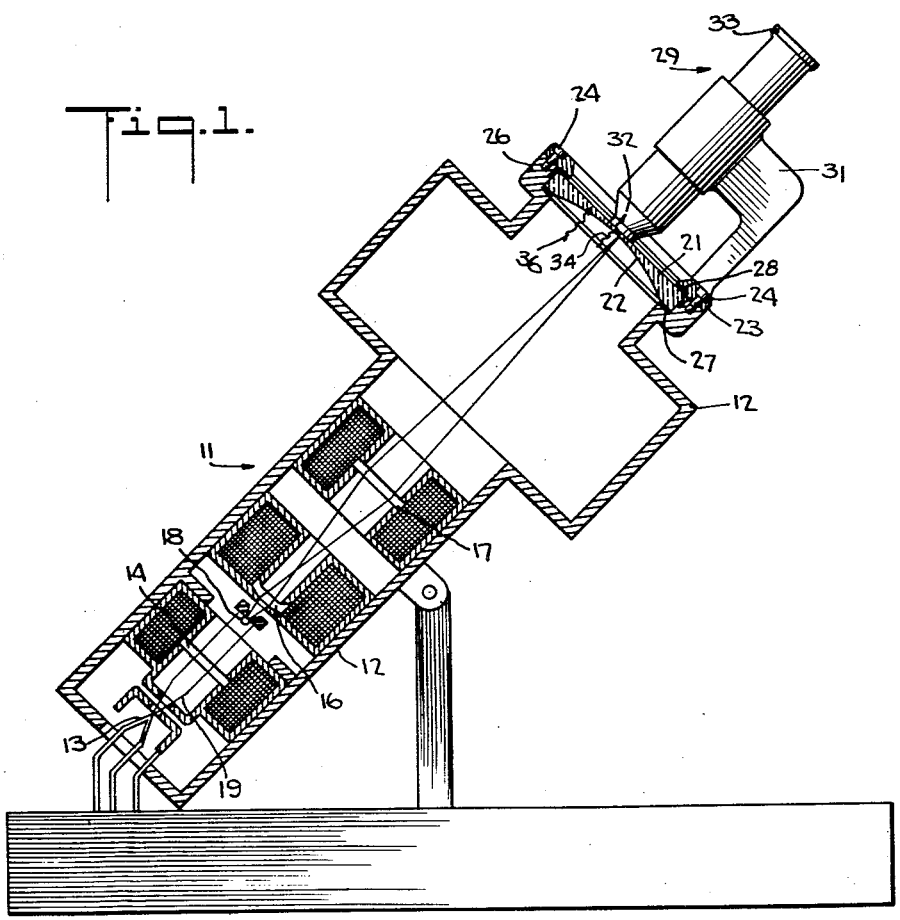

Sept. 22, 1964  A. P. WILSKA  3,150,255

VIEWING WINDOW FOR ELECTRON-OPTICAL DEVICES

Filed July 5, 1962

INVENTOR.
ALVAR P. WILSKA
BY
ATTORNEYS

United States Patent Office 3,150,255
Patented Sept. 22, 1964

3,150,255
VIEWING WINDOW FOR ELECTRON-
OPTICAL DEVICES
Alvar P. Wilska, Tucson, Ariz., assignor to Philips
Electronics and Pharmaceutical Industries Corp.,
New York, N.Y., a corporation of Maryland
Filed July 5, 1962, Ser. No. 207,672
5 Claims. (Cl. 250—49.5)

This invention relates to a viewing window to be attached to an electron-optical device, such as an electron microscope, normally at the outer end thereof.

In electron microscopes to be used at very high levels of magnification it is frequently necessary to employ an optical enlarger external to the electron microscope to enlarge the image to a greater degree than is conveniently possible by the electron microscope alone. For this purpose a transparent viewing window may be provided at the end of the microscope and the electron beam focused on it. A fluorescent screen is applied to the inner surface of the window to be energized by the electron beam so as to form a pattern of light and shadow representative of an enlarged picture of the object under study. The optical enlarger, which may be a light-optical microscope, is outside of the electron microscope, and, in accordance with good design, the objective lens of the optical enlarger should be very close to the fluorescent screen on the inner surface of the viewing window of the electron microscope.

However, the great pressure differential between the evacuated interior of an electron microscope and the normal atmospheric pressure outside of it makes it impossible to use as thin a viewing window as would be desired. Furthermore, the high voltage differences within an electron microscope raise the possibility that X-rays may be generated therein and projected directly through the viewing window, if the viewing window is directly in line with the electron beam rather than being off to one side as is frequently the case. This presents an operational health hazard that must be avoided at all cost.

In accordance with the present invention the viewing window of an electron microscope is located directly athwart the path of the electron beam, and the central area of the viewing window is made much thinner than the peripheral area and the fluorescent material is applied directly to the inner surface thereof. Not only does a window having this configuration make it possible to place the objective lens of the optical enlarger in a preferred location but it also assists in shielding the operator from X-radiation without adversely affecting the optical image. In addition the curvature of the window assists in improving the contrast of the light image by reducing spurious reflections or by directing these reflections to a point on the window at which they will not be visible through the optical enlarger.

Figure 3:
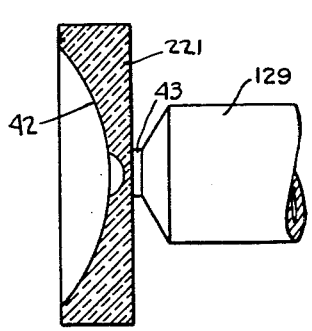
Figure 2:
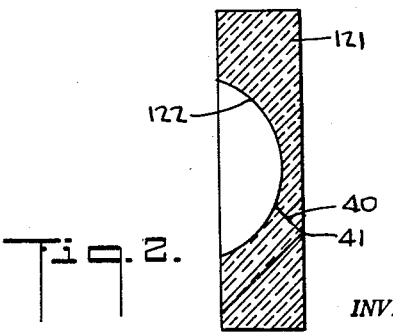

The invention will be described in greater detail, with particular reference to electron microscopes, in connection with the drawings in which:

FIG. 1 shows a simplified cross-sectional view of an electron microscope provided with a plano-concave window according to the invention and showing the location of an optical enlarger attached to the electron microscope; and FIGS. 2 and 3 show cross-sectional views of different embodiments of viewing windows suitable for use in the electron microscope in FIG. 1.

The electron microscope 11 in FIG. 1 comprises a hollow outer casing 12 containing a cathode 13 near one end and a plurality of electromagnetic electron lenses. These lenses include a condenser lens 14, an electromagnetic objective lens 16, and an electromagnetic projection lens 17.

The object to be studied is indicated by reference character 18 and is placed adjacent to the objective lens 16 to be irradiated by the electron beam 19. At the opposite end of the casing 12 from the cathode 13 and transverse to the electron beam 19 is a viewing window 21, the outer surface of which is planar and the inner surface of which is concave and is coated with a thin layer of material suitable for a fluorescent screen 22.

The window 21 may be held in place by any convenient means, such as a clamping ring 23 which is secured by a number of bolts 24 to a matching edge 26 of the shell 12. A gasket 27 seals the edge of the window to the shell 12 to make the shell 12 vacuum-tight, and a second gasket 28 protects the edge of the window from direct contact with the clamping ring 23 and also assists in making the microscope vacuum-tight.

An optical enlarger 29, which is, in reality, a light-optical microscope, is supported in any convenient way, such as by means of a clamp 31, which holds the enlarger rigidly with respect to the casing 12 of the electron microscope. The optical enlarger 29 has an objective lens at the end 32 close to the viewing window 21 and a projection lens at the opposite end 33 that cooperate in the usual way to form an optically enlarged image of a minute area of the fluorescent screen 22. The thinness of the window 21 on which the screen 22 is deposited or formed permits an objective lens of short focal length to be used in the optical enlarger, since it can be brought very close to the screen 22.

Positioning the optical enlarger 29 over the thin, central area of the viewing window 21 yields an additional advantage. Even in relatively low-voltage electron microscopes operating at acceleration voltages of 5,000 v. to 20,000 v. some X-rays will be produced. Such a low-voltage microscope is disclosed in my co-pending application entitled "Column for Electron Microscopes" and filed concurrently herewith. These X-rays will be relatively soft, that is, easily absorbed, but still hazardous to an operator who may spend many hours a day with the instrument. This is especially true in the case of a direct-view electron microscope, such as the present one, which is constructed so that the operator looks directly into the end of it and faces the electron beam as well as any X-radiation generated within the instrument. In previous direct-view microscopes a relatively thick end window of X-ray absorbing lead glass has been used, but since one of the objects of the present invention is to get the objective lens of the optical enlarger as close as possible to the internal fluorescent screen 22, a thick viewing window cannot be used and even lead glass will not stop all of the X-radiation at the center of the concave viewing window 21.

However, by locating the optical enlarger directly over the thickest portion of the viewing window 21, the most troublesome X-rays, indicated by the arrow 34, will be absorbed in the optical enlarger itself while the other X-rays that might bypass the optical enlarger, as indicated by the arrow 36, are absorbed in the thicker peripheral portions of the viewing window 21.

A viewing window of the type shown in FIG. 1 and having a diameter of approximately 6 cm. may be reduced in thickness to approximately .5 mm. at its center and still withstand atmospheric pressure, if the peripheral thickness is approximately 5–8 mm. If the curvature of the concave side of the window is formed with a uniform radius, the radius should therefore be approximately 10 cm. to 6.4 cm.

On the other hand, where it is desirable to reduce the thickness of the central portion of the window still further, it has been found desirable to limit the area of reduced thickness to merely the center of the face plate, as indicated by the face plate 121 shown in cross-sectional view in FIG. 2. In this case, for a peripheral portion of the face plate having a diameter of 3 cm. and a thickness of 5–8 mm., the center may be reduced in thickness to approximately .2 mm. by grinding away a spherical sector limited to the central region of the face plate 121.

In addition to permitting a greater reduction in the thickness than is possible in the case of the window of FIG. 1, the window of FIG. 2 also results in a reduction of halo produced by light emitted from the fluorescent screen 122 on the rear surface of the viewing window 121 and reflected by the front surface of the window. As indicated by the light ray 40, light that is emitted from the fluorescent screen 122 is emitted at such an angle as to be reflected by the front surface of the viewing window 121 at a point 41 which is of considerable distance from the central region of the face plate where the optical enlarger will be focused. This reduction in the halo produced enhances the contrast ratio of the image by reviewing spurious reflections.

FIG. 3 shows a further modification of the window when it is desired to reduce the face plate to the ultimate degree. The face plate 221 in FIG. 3 has a spherical sector removed from one surface by grinding away or forming the concave surface 42 of the viewing window 221 with a relatively large radius, such as the 6–10 cm. radius of FIG. 1. In addition, the centermost part of the viewing window 221 is further ground away to form a depression of considerably less radius and to reduce the thickness of the center of the viewing window to between approximately .1 and .2 mm. As indicated, the optical arrangement may be further improved by using an oil immersion objective lens on the optical enlarger 129. The immersing oil is indicated by reference character 43. Such an enlarger has a very short focal length and is especially suited for use with the viewing windows described herein, particularly the window in FIG. 3.

In addition to the embodiments shown and described herein, it will be apparent to those skilled in the art that still further modifications may be made within the scope of the invention as defined by the following claims.

What is claimed is:

1. An electron microscope comprising: means for generating an electron beam; a specimen holder; a viewing window disposed transversely to the path of said beam, said window having one thickness in a central region struck by said beam and a greater thickness at the periphery; a fluorescent screen on the inner surface of said window in the region struck by said beam; electron lens means for focusing said beam on said screen; and a clamp holding the periphery of said window in place against said microscope and sealing said window to said microscope.

2. An electron microscope comprising: means for generating an electron beam; a specimen holder; a viewing window disposed transversely to the path of said beam, said window having one thickness in a central region struck by said beam and a greater thickness at the periphery, and one surface of said window having a spherically concave curvature; a fluorescent screen on the inner surface of said window facing said beam; electron lens means for focusing said beam on said screen; and a clamp holding the periphery of said window in place on said microscope and sealing said window to said microscope.

3. An electron microscope comprising: means for generating an electron beam; a specimen holder; a viewing window disposed transversely to the path of said beam and having a substantially uniform thickness around the periphery thereof and over an annular region extending inwardly from said periphery, one surface of said window having a spherically curved depression in the center thereof; a fluorescent screen on the inner surface of said window facing said beam; electron lens means for focusing said beam on said screen; and a clamp holding the periphery of said window in place on said microscope and sealing said periphery to said microscope.

4. An electron microscope comprising: means for generating an electron beam; a specimen holder; a viewing window disposed transversely to the path of said beam and having a spherically concave inner surface making the central region of said window struck by said beam thinner than the perimeter of said window; a fluorescent screen on said concave surface; electron lens means for focusing said beam on said screen; and a clamp holding the periphery of said window in place on said microscope and sealing said periphery to said mocroscope.

5. An electron microscope comprising: means for generating an electron beam; a specimen holder; a viewing window disposed transversely to the path of said beam, the inner surface of said window facing said beam having a first spherical curvature of a certain radius facing said beam to make said window thinner in the central region thereof than at the perimeter, said window having a spherically concave depression defined by a spherical radius less than said certain radius in said central region to reduce still further the thickness of said window at the center thereof; a fluorescent screen on the inner surface of said window; electron lens means for focusing said beam on said screen; and a clamp holding the periphery of said window in place on said microscope, and a vacuum-tight seal sealing said periphery to said microscope.

References Cited in the file of this patent

UNITED STATES PATENTS

| 2,363,359 | Ramo | Nov. 21, 1944 |
| 2,408,287 | Bachman | Sept. 24, 1946 |

FOREIGN PATENTS

| 915,253 | Germany | July 19, 1954 |